United States Patent
Korst et al.

(10) Patent No.: US 7,334,103 B2
(45) Date of Patent: Feb. 19, 2008

(54) METHODS AND APPARATUS FOR IMPROVING THE BREATHING OF DISK SCHEDULING ALGORITHMS

(75) Inventors: Johannes H. M. Korst, Eindhoven (NL); Hong Li, Veldhoven (NL); Robert Jochemsen, Eindhoven (NL); Nicolaas Lambert, Waalre (NL); Gerardus W. T. Van Der Heijden, Haaren (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 406 days.

(21) Appl. No.: 10/538,211

(22) PCT Filed: Dec. 8, 2003

(86) PCT No.: PCT/IB03/05758

§ 371 (c)(1),
(2), (4) Date: Jun. 9, 2005

(87) PCT Pub. No.: WO2004/053676

PCT Pub. Date: Jun. 24, 2004

(65) Prior Publication Data

US 2006/0020748 A1    Jan. 26, 2006

Related U.S. Application Data

(60) Provisional application No. 60/432,544, filed on Dec. 11, 2002.

(51) Int. Cl.
*G06F 12/00* (2006.01)

(52) U.S. Cl. .............................. 711/167; 710/6; 710/56
(58) Field of Classification Search ................. 711/167
See application file for complete search history.

(56) References Cited

U.S. PATENT DOCUMENTS

| 5,586,264 A | * | 12/1996 | Belknap et al. ............. 725/115 |
| 5,802,394 A | * | 9/1998 | Baird et al. .................... 710/5 |
| 6,061,732 A | | 5/2000 | Korst |
| 6,496,899 B1 | * | 12/2002 | DeMoney ................... 711/112 |

FOREIGN PATENT DOCUMENTS

| WO | WO 99/15953 | 4/1999 |
| WO | WO 00/57635 | 9/2000 |

* cited by examiner

*Primary Examiner*—Donald Sparks
*Assistant Examiner*—Hashem Farrokh

(57) ABSTRACT

A method for breathing of scheduling algorithms for a storage device (110). The method including: (a) computing a worst-case duration of a breathing cycle (P) for the storage device (110); (b) starting a breathing cycle; (c) determining if one of the following becomes true before the end of P: (i) a number of real-time requests is at least a predetermined threshold based on a number of data streams and performance parameters of the storage device; and (ii) a number of pending requests for any single stream becomes more than one; (d) if at least one of (i) and (ii) remain true during the duration of P, starting a subsequent breathing cycle after completion of the breathing cycle; and (e) if both of (i) and (ii) are not true during the duration of P, waiting P time units from the start of the breathing cycle before starting the subsequent breathing cycle.

20 Claims, 1 Drawing Sheet

METHODS AND APPARATUS FOR IMPROVING THE BREATHING OF DISK SCHEDULING ALGORITHMS

CROSS REFERENCE TO RELATED APPLICATION

Figure 1:
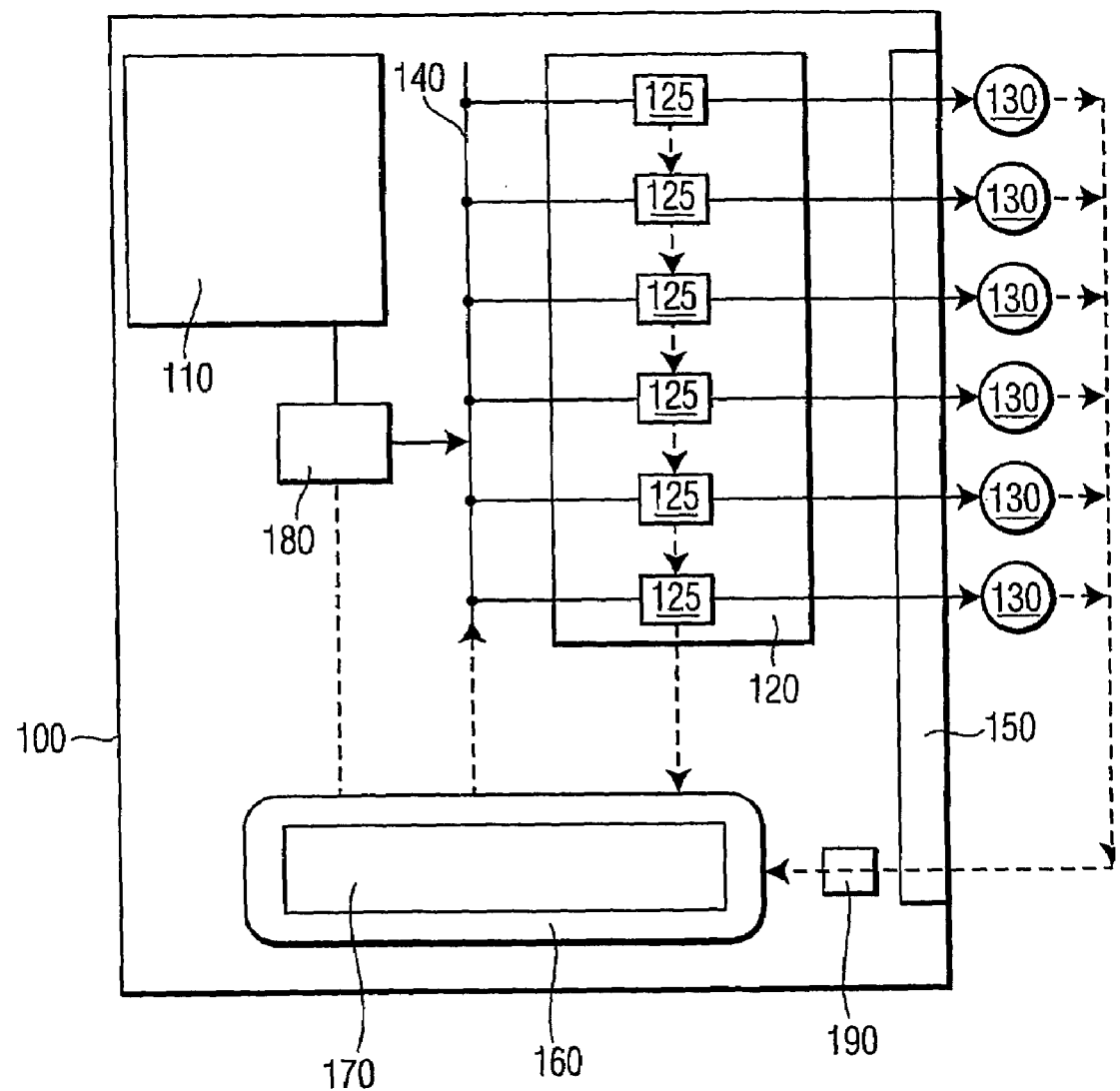

This application claims the benefit of U.S. provisional application Ser. No. 60/432,544 filed Dec. 11, 2002, which is incorporated herein by reference.

The present invention relates generally to breathing of disk scheduling algorithms, and more particularly, to methods for improving the breathing by delaying the handling of real-time requests, provided certain conditions are not satisfied, to alleviate problems associated with prior art breathing of disk scheduling algorithms.

The present invention relates generally to breathing of disk scheduling algorithms, and more particularly, to methods for improving the breathing by delaying the handling of real-time requests, provided certain conditions are not satisfied, to alleviate problems associated with prior art breathing of disk scheduling algorithms.

The current cycle-based disk scheduling algorithms serve disk requests batch by batch, in such a way that for each stream at most one disk access is being handled per batch. Given that a maximum bit rate is known for each of the streams and given an accurate model of the guaranteed throughput of the disk, the duration of a worst-case cycle is determined, and based on that cycle, the buffer sizes and the sizes of the blocks that are repeatedly transferred between the disk and the buffers are determined. In addition, bandwidth for so-called best-effort requests can be reserved by reserving a given fraction of the worst-case cycle for best-effort requests.

The disk algorithms are called breathing, in the sense that a new batch is handled immediately when the previous batch is completed. Given that worst-case assumptions on both the bit rate of the streams and the disk performance parameters are incorporated in determining the worst-case cycle, the buffer sizes, and the block sizes, the number of real-time requests per batch will usually be substantially smaller than the number of streams. If the current load on the disk is low, then the batches will be small, and the response time on starting up a new stream or issuing a large best-effort request will be small. Whenever, the load on the disk increases, it will automatically start handling larger batches, and in doing so, spend less time on switching. So, whenever required, the disk will automatically start working more efficiently. An additional advantage of this breathing behavior is that the algorithm is less sensitive to rogue streams, where a rogue stream is a stream that temporarily or continuously requires a higher bit rate than assumed. Whenever the algorithm has available bandwidth, it will automatically serve those streams more frequently than was accounted for in the worst-case analysis, without endangering the performance that was guaranteed to the other streams. So all available bandwidth that becomes available because of a better than worst-case performance of the disk and because of some other streams requiring a bit rate that is smaller than the assumed maximum is not wasted but can be spent on rogue streams.

However, these breathing algorithms are associated with some disadvantages. To immediately start a new batch, whenever the previous one is completed has the following disadvantages:

1. An application that issued best-effort requests only one at a time, which is usual in normal PC applications, will be able to issue only one best-effort request per cycle. If this application wants to issue many small requests, but blocks whenever one request is issued, then the resulting average bit rate can be quite low.

2. Generally, the average required bit rate by the real-time streams will be considerably smaller than is worst case required. As a result, the number of real-time requests per cycle will be quite small. The effect is that a relatively large fraction of the time is spent on seeking. This has an adverse effect on the energy consumption, on the life time of the disk, and on the noise it produces when in operation.

Therefore it is an object of the present invention to provide an improvement in the breathing of disk scheduling algorithms over that which is currently utilized in the art. Accordingly, a method for breathing of scheduling algorithms for a storage device is provided. The method comprising: (a) computing a worst-case duration of a breathing cycle for the storage device, the worst-case duration being referred to by P; (b) starting a breathing cycle; (c) determining if one of the following becomes true before the end of P time units: (i) a number of real-time requests is at least a predetermined threshold based on a number of data streams and performance parameters of the storage device; and (ii) a number of pending requests for any single stream becomes more than one; (d) if at least one of (i) and (ii) remain true during the duration of P time units from the start of the breathing cycle, starting a subsequent breathing cycle after completion of the breathing cycle; and (e) if both of (i) and (ii) are not true during the duration of P time units from the start of the breathing cycle, waiting P time units from the start of the breathing cycle before starting the subsequent breathing cycle.

Preferably, best-effort requests arriving during the breathing cycle are handled during the breathing cycle.

The method preferably further comprises, repeating steps (b)-(e) for a plurality of breathing cycles.

The method preferably further comprises (f) calculating an actual bit-rate of a data stream based on the determination of step (ii). In which case, the method further comprises (g) changing a bit rate for the data stream based on the calculating in step (f). Preferably, step (g) comprises reserving a higher bit rate for the data stream where its estimated maximum bit rate is exceeded where the data stream is transferred between the storage device and a buffer, the method further comprises (h) increasing the buffer size. Alternatively, step (g) comprises reserving a lower bit rate for the data stream where its estimated maximum bit rate is not exceeded where the data stream is transferred between the storage device and a buffer, the method further comprises (h) decreasing the buffer size.

Also provided is a storage device scheduler for controlling the breathing of scheduling algorithms for a storage device. The storage device scheduler comprising: (a) means for computing a worst-case duration of a breathing cycle for the storage device, the worst-case duration being referred to by P; (b) means for instructing the starting of a breathing cycle; (c) means for determining if one of the following becomes true before the end of P time units: (i) a number of real-time requests is at least a predetermined threshold based on a number of data streams and performance parameters of the storage device; and (ii) a number of pending requests for any single stream becomes more than one; (d) means for starting a subsequent breathing cycle after completion of the breathing cycle if at least one of (i) and (ii) remain true during the duration of P time units from the start of the breathing cycle,; and (e) means for waiting P time units from the start of the breathing cycle before starting the subsequent breathing cycle if both of (i) and (ii) are not true during the duration of P time units from the start of the breathing cycle.

The storage device scheduler preferably further comprises repeating steps (b)-(e) for a plurality of breathing cycles.

The storage device scheduler preferably further comprises (f) calculating an actual bit-rate of a data stream based on the determination of step (ii). In which case the storage device scheduler preferably further comprises (g) changing a bit rate for the data stream based on the calculating in step (f). Preferably, step (g) comprises reserving a higher bit rate for the data stream where its estimated maximum bit rate is exceeded where the data stream is transferred between the storage device and a buffer, the method further comprises (h) increasing the buffer size. Alternatively, step (g) comprises reserving a lower bit rate for the data stream where its estimated maximum bit rate is not exceeded where the data stream is transferred between the storage device and a buffer, the method further comprises (h) decreasing the buffer size.

Also provided are a computer program product for carrying out the methods of the present invention and a program storage device for the storage of the computer program product therein.

These and other features, aspects, and advantages of the apparatus and methods of the present invention will become better understood with regard to the following description, appended claims, and accompanying drawing where the FIGURE illustrates a schematic view of a system architecture for use with the methods of the present invention. Referring now to the FIGURE, there is illustrated a schematic representation of a system architecture, generally referred to by reference numeral 100. Those skilled in the art will appreciate that the system architecture in the FIGURE is given by way of example only and not to limit the scope or spirit of the present invention. The methods of the present invention can be utilized in any system that employs disk-scheduling algorithms for retrieving data from a storage device, such as a hard drive disk.

FIG. 1 schematically shows a block diagram of a system 100 for use with the methods of the present invention. Examples of such systems 100 are hard disk recorders, set-top boxes, television sets, audio jukeboxes, and video and multimedia servers. Multimedia applications can be characterized by an extensive use of audio-visual material. The methods of the invention are applicable to (VOD) servers as well as home servers, personal video recorders, portable multimedia devices, and any device that uses a disk or other storage device to play out audio or video.

For the playback of audio or video a (near-) continuous supply of audio/video data is required. Known examples of a multimedia server include a near-video-on-demand server and a video-on-demand server. In a near-video-on-demand system the service provider determines when a title is reproduced. A data stream containing the data of the title may be received by many users simultaneously. In a video-on-demand system, typically the user selects a title and controls, with VCR-like controls, the reproduction of the title. The level of interaction is higher and a data stream is typically only consumed by one user. A multimedia server is usually implemented using a file server that is specifically designed to supply continuous data streams for a large number of users in parallel.

Usually, one or more multimedia titles are stored on a background storage medium 110. Typically, disks, such as hard disks, are used as the background storage medium 110, based on their large storage capacity at low cost and the possibility of random access. It will be appreciated that also other storage media, such as optical disks, tape, or even solid-state memory may be used. The storage medium 110 is preferably a single storage device, but may be divided into a plurality of storage units in which case data can be striped across the multiple disks in such a way that a request to read or write a block of data results in a disk access on each disk.

The system 100 comprises a reader 180 for reading data from the storage medium 110. The reader 180 may be implemented using a SCSI or IDE interface. Advantageously, the storage medium 110 is also included in the system 100. For a disk oriented storage medium 110, data is retrieved in units of a Disk Access Block (DAB), where a DAB is formed by a sequence of consecutive sectors. The reader 180 may also include a caching memory for temporarily storing data read from the disk before supplying the data, potentially in a different sequence than read from disk, via a bus 140 to the remainder of the system 100. Particularly for video, a data stream may be very voluminous. To reduce the volume, typically, compression techniques are used. The compression scheme may result in a fixed rate data stream, for instance using a fixed rate form of MPEG-1 encoding, or a variable rate data stream, for instance using a variable rate form of MPEG-2 encoding. The system may be used for fixed rate systems as well as variable rate systems. Normally, the data is stored in the storage medium 110 and processed by the system 100 in a compressed form. Only at the user 130 the data stream is decompressed, using a decoder. Particularly for a variable rate system, the system 100 may also be able to support VCR-like control functions. The system 100 maintains for the data stream a stream status that indicates the current state. The stream status for one or more data streams may be stored in a status memory 190, such as the main memory (RAM) of the server or special registers. Data is read from the storage medium 110 for a batch of data streams where the data of the batch is supplied as a time multiplexed stream via the bus 140. The storage medium 110 is not capable of simultaneously supplying continuous data streams to all users of the system. Instead, data for a subset of data streams is read and supplied to the remainder of the system 100 at a higher data rate then consumed by the corresponding data streams. The system 100, therefore, comprises buffers 125 for achieving supply of data at the required rate to the users 130. Usually, the buffers 125 are implemented using RAM in a part 120 of the system's memory. The system 100 further comprises communication means 150 for transferring data of the data streams to users. The communication means 150 may be formed by any suitable means, such as a local area network, for supplying the data to users located near the system 100. In practice, a telecommunication or cable network is used for supplying the data over a longer distance.

The system 100 also comprises a control unit 160 for controlling the system 100. A main part of the control unit is formed by the scheduler 170, which determines which DABs should be read by the reader 180 from the storage medium 110 in order to avoid that an underflow or overflow of the buffers 125 occurs. The control unit is typically formed by a processor, such as a RISC-, or CISC-type microprocessor, which is operated under control of a real-time operating system, loaded from a storage medium, such as ROM or a hard disk. The scheduler 170 may be implemented as a software module integrated into the operating system or loaded as an application program. Typically, the scheduler 170 receives status information, such as a filling degree of the buffers, upon which the scheduler 170 bases its decision. For systems that offer VCR-like controls, the scheduler also receives information regarding the status of a stream. In such systems, typically, control information is received from the users 130 via the communication means 150. Where the storage device 100 is a hard disk, data is stored in concentric circles, called tracks, on the disk. Each track consists of an integer number of sectors. Tracks near the outer edge of a disk may contain more sectors than tracks near the inner edge. For this purpose, modern disks arrange the set of tracks in non-overlapping zones, where the tracks in a zone have the same number of sectors and different zones correspond to different number of sectors per track. Typically, a disk rotates at a constant angular velocity, so that reading from tracks in a zone near the outer edge results in a higher data transfer rate than reading from tracks in a zone near the inner edge. The time required for accessing data from the disk is mainly determined by: a seek time, i.e., the time needed to move the reading head to the desired track, a rotational latency, i.e., the time that passes before the required data moves under the reading head once the track has been reached, and a read time, i.e., the time needed to actually read the data. The sum of the seek time and the rotational latency is referred to as switch time. The read time depends on the amount of data to be read and the radial position of the track (s) on which the data is stored. The rotational latency per access takes at most one revolution of the disk. The seek time per access is maximal if the reading head has to be moved from the inner edge to the outer edge of the disk, or vice versa. To avoid that such a maximum, seek has to be taken into account for each access, disk accesses are handled in batches, called a sweep. As the head moves from the inner edge to the outer edge, or vice versa, the required data blocks are read in the order in which they are encountered on disk.

The methods of the present invention will now be described with reference to the Figure. Focusing on a triple buffering algorithm, as is known in the art, such as that presented by Korst et al. Disk scheduling for variable-rate data streams, Proc. European Workshop on Interactive Distributed Multimedia Systems and Telecommunication Services, IDMS'97, Darmstadt, September 10-12, Lecture Notes in Computer Science, 1309(1997)119-132 (1997), the breathing is preferably adjusted as follows. However, those skilled in the art will appreciate that other algorithms now known or later developed can also be utilized with the methods of the present invention. Let the worst-case duration of a cycle be given by P, wherein a cycle is defined as the time interval that is used to retrieve typically (at most) one DAB for each data stream, possibly reserving additional time for handling best-effort requests. The calculation of the worst-case duration of a cycle is well known in the art. Whenever a cycle is completed, the next cycle can be started immediately thereafter, as is currently implemented in the art, however, in the methods of the present invention the start of the next cycle can be delayed for P time units after the completed cycle. Provided that all streams do not exceed their maximum bit rates, it can still be guaranteed that buffer underflow and buffer overflow will not occur in the latter case. Both approaches can be considered as two extremes of a range of possible strategies to determine when the next cycle is to be started.

This alternative strategy that better balances the advantages and disadvantages of breathing will now be described in more detail. The strategy of the methods of the present invention is to wait until P time units have passed since the start of the previous cycle to start the next cycle, unless one of the two following conditions becomes true before this time. If one of these conditions becomes true, then the next cycle is started immediately. As long as the next cycle is not started, the disk need not to be idle but best-effort requests can be handled in successive batches. Best-effort requests should be handled in such a way that the next cycle that includes real-time requests is not started later than the P time units after the start of the current cycle. Furthermore, after the completion of each batch of best-effort requests, the conditions should be checked.

The conditions to immediately start the next cycle are

1. The number of (real-time) requests is at least nthreshold, where nthreshold is a suitably chosen number that depends on the number of streams n, and on the disk performance parameters. If $n \geq 5$, then nthreshold could be chosen equal to 2 or 3. Three requests per cycle results in a reasonably efficient use of sweeps.

2. The number of pending requests for a single stream becomes 2. If the stream does not exceed its maximum bit rate, then this condition will never be true. However, if some stream temporarily or continuously exceeds its estimated maximum bit rate, then buffer underflow or overflow should be avoided, whenever possible.

By starting the next cycle earlier than waiting for P time units to pass, a larger bit rate can be offered to such streams, without endangering the guaranteed bit rates for other streams. Since both requests are now handled in the same sweep, the chances for an efficient sweep improve because two requests of a single stream will often be contiguous. Note that when a new stream is started, it will immediately issue two or even three requests. In that case, the above second condition is satisfied and the start-up time of the new stream will correspondingly be small. The above strategy maintains to a large extend the advantages of breathing. The average response times will still be considerably smaller than worst-case, since on average cycles will still be considerably shorter than P time units. Rogue streams can still receive a higher bit rate than their maximum bit rate, provided that there is available bandwidth to do so.

In addition, it alleviates the disadvantages of breathing to a large extent. An application that issues small best-effort requests one at a time will be able to issue multiple requests per cycle. As long as the next cycle is not started, it can repeatedly issue requests. Also, the disk will behave more energy-efficient, produce less noise, and will have a longer lifetime, since it will be more idle, especially when on average the best-effort load is moderate.

An additional advantage of the above strategy is that checking the second condition can be used to provide feedback on the actual bit rate of a stream. If a steam continuously exceeds its estimated maximum bit rate, then the data blocks that are repeatedly transferred between disk and buffer for that stream are increased, i.e., to reserve a higher bit rate for that stream. The buffer size of this stream would be increased correspondingly. In addition, if a stream continuously requires a lower bit rate than it's estimated maximum bit rate, then adjusting its block and buffer sizes could also be considered.

EXAMPLE

Applying a disk-scheduling method of the present invention to a prototype system, the following improved results were observed. In addition to twelve real-time streams, a large batch of best-effort requests was issued. With 12 DVB video streams, using a worst-case cycle length of 600 ms to access an IBM Deskstar 60GXP 40GB disk, the following results were obtained:

If the total bit rate of the video streams is 48 Mbit/s, then an increase of the bit rate for best-effort data from 8.8 Mbit/s to 16.8 Mbit/s was observed, when using a preferred implementation of the methods of the present invention where a new cycle is always started immediately upon completion of the previous one. If the total bit rate of the video streams is 56 Mbit/s, then an increase of the bit rate for best-effort data from 0.8 Mbit/s to 9.6 Mbit/s was observed. Hence, the gain greatly depends on the real-time load on the disk. This is confirmed by other experiments. The best-effort requests consisted of 10 blocks of 1 MByte for each experiment. In the above example, P=600 ms and n=12 (i.e., twelve real-time streams).

These preliminary experiments indicate at least an increase of the best-effort rate of a factor of three to six. In addition, trick play that is (partly) handled as best effort operated with substantially less problems.

The methods of the present invention are particularly suited to be carried out by a computer software program, such computer software program preferably containing modules corresponding to the individual steps of the methods. Such software can of course be embodied in a computer-readable medium, such as an integrated chip or a peripheral device.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. A method for breathing of scheduling algorithms for a storage device, the method comprising:
   (a) computing a worst-case duration of a breathing cycle for the storage device, the worst-case duration being referred to by P;
   (b) starting a breathing cycle;
   (c) determining if one of the following becomes true before the end of P time units:
   (i) a number of real-time requests is at least a predetermined threshold based on a number of data streams and performance parameters of the storage device; and
   (ii) a number of pending requests for any single stream becomes more than one;
   (d) if at least one of (i) and (ii) remain true during the duration of P time units from the start of the breathing cycle, starting a subsequent breathing cycle after completion of the breathing cycle; and
   (e) if both of (i) and (ii) are not true during the duration of P time units from the start of the breathing cycle, waiting P time units from the start of the breathing cycle before starting the subsequent breathing cycle.

2. The method of claim 1, wherein best-effort requests arriving during the breathing cycle are handled during the breathing cycle.

3. The method of claim 1, further comprising, repeating steps (b)-(e) for a plurality of breathing cycles.

4. The method of claim 1, further comprising (f) calculating an actual bit-rate of a data stream based on the determination of step (ii).

5. The method of claim 4, further comprising (g) changing a bit rate for the data stream based on the calculating in step (f).

6. The method of claim 5, wherein step (g) comprises reserving a higher bit rate for the data stream where its estimated maximum bit rate is exceeded.

7. The method of claim 6, wherein the data stream is transferred between the storage device and a buffer, the method further comprises (h) increasing a size of the buffer.

8. The method of claim 5, wherein step (g) comprises reserving a lower bit rate for the data stream where its estimated maximum bit rate is not exceeded.

9. The method of claim 8, wherein the data stream is transferred between the storage device and a buffer, the method further comprises (h) decreasing a size of the buffer.

10. A storage device scheduler for controlling the breathing of scheduling algorithms for a storage device, the storage device scheduler comprising:
    (a) means for computing a worst-case duration of a breathing cycle for the storage device, the worst-case duration being referred to by P;
    (b) means for instructing the starting of a breathing cycle;
    (c) means for determining if one of the following becomes true before the end of P time units:
    (i) a number of real-time requests is at least a predetermined threshold based on a number of data streams and performance parameters of the storage device; and
    (ii) a number of pending requests for any single stream becomes more than one;
    (d) means for starting a subsequent breathing cycle after completion of the breathing cycle if at least one of (i) and (ii) remain true during the duration of P time units from the start of the breathing cycle,; and
    (e) means for waiting P time units from the start of the breathing cycle before starting the subsequent breathing cycle if both of (i) and (ii) are not true during the duration of P time units from the start of the breathing cycle.

11. The storage device scheduler of claim 10, further comprising, repeating steps (b)-(e) for a plurality of breathing cycles.

12. The storage device scheduler of claim 10, further comprising (f) calculating an actual bit-rate of a data stream based on the determination of step (ii).

13. The storage device scheduler of claim 12, further comprising (g) changing a bit rate for the data stream based on the calculating in step (f).

14. The storage device scheduler of claim 13, wherein step (g) comprises reserving a higher bit rate for the data stream where its estimated maximum bit rate is exceeded.

15. The storage device scheduler of claim 14, wherein the data stream is transferred between the storage device and a buffer, the method further comprises (h) increasing a size of the buffer.

16. The storage device scheduler of claim 13, wherein step (g) comprises reserving a lower bit rate for the data stream where its estimated maximum bit rate is not exceeded.

17. The storage device scheduler of claim 16, wherein the data stream is transferred between the storage device and a buffer, the method further comprises (h) decreasing a size of the buffer.

18. The storage device scheduler of claim 10, further comprising means for handling best-effort requests arriving during the breathing cycle during the breathing cycle.

19. A program storage device readable by machine, tangibly embodying a program of instructions executable by the machine to perform method steps for breathing of scheduling algorithms for a storage device, the method comprising:
    (a) computing a worst-case duration of a breathing cycle for the storage device, the worst-case duration being referred to by P;
    (b) starting a breathing cycle;

(c) determining if one of the following becomes true before the end of P time units:

(i) a number of real-time requests is at least a predetermined threshold based on a number of data streams and performance parameters of the storage device; and (ii) a number of pending requests for any single stream becomes more than one;

(d) if at least one of (i) and (ii) remain true during the duration of P time units from the start of the breathing cycle, starting a subsequent breathing cycle after completion of the breathing cycle; and (e) if both of (i) and (ii) are not true during the duration of P time units from the start of the breathing cycle, waiting P time units from the start of the breathing cycle before starting the subsequent breathing cycle.

20. A computer program product embodied in a computer-readable medium for breathing of scheduling algorithms for a storage device, the method comprising:

(a) computer readable program code means for computing a worst-case duration of a breathing cycle for the storage device, the worst-case duration being referred to by P;

(b) computer readable program code means for starting a breathing cycle;

(c) computer readable program code means for determining if one of the following becomes true before the end of P time units:

(i) a number of real-time requests is at least a predetermined threshold based on a number of data streams and performance parameters of the storage device; and (ii) a number of pending requests for any single stream becomes more than one;

(d) computer readable program code means for if at least one of (i) and (ii) remain true during the duration of P time units from the start of the breathing cycle, starting a subsequent breathing cycle after completion of the breathing cycle; and (e) computer readable program code means for if both of (i) and (ii) are not true during the duration of P time units from the start of the breathing cycle, waiting P time units from the start of the breathing cycle before starting the subsequent breathing cycle.

* * * * *